United States Patent [19]

Shanks et al.

[11] Patent Number: 5,279,106
[45] Date of Patent: Jan. 18, 1994

[54] SPLIT CLEVIS ASSEMBLY FOR SUSPENDING A CHAIN ON A HANGER

[76] Inventors: Douglas G. Shanks, 7726 Bonniebrook Ct.; Douglas G. Shanks, Jr., 4701 Charlesgate, both of Sylvania, Ohio 43560

[21] Appl. No.: 957,191

[22] Filed: Oct. 6, 1992

[51] Int. Cl.$^5$ ............................................. F16G 15/04
[52] U.S. Cl. ........................................ 59/93; 59/78; 59/85; 59/901
[58] Field of Search ................ 59/78, 80, 84, 85, 86, 59/89, 93, 901

[56] References Cited

U.S. PATENT DOCUMENTS

| | | | |
|---|---|---|---|
| 653,374 | 7/1900 | Barry | 59/78 |
| 2,716,280 | 8/1955 | Ruhe | 59/78 |
| 3,421,313 | 1/1969 | Harada et al. | 59/78 |
| 3,958,411 | 5/1976 | Bernt | 59/86 |
| 4,355,502 | 10/1982 | Sheldon | 59/84 |

Primary Examiner—David Jones
Attorney, Agent, or Firm—David C. Purdue

[57] ABSTRACT

A split clevis which is especially suited for suspending heat transfer chain from hangers in rotary kilns is disclosed. The clevis comprises first and second arms and an opening is provided at one end of each arm for receiving an end link of a chain. In a chain assembly including the clevis, the end link connects the rest of the links in the chain to the first and second arms. A support shaft is provided on the first arm. The support shaft has a first portion, adjacent to the second end of the first arm to which it is attached. The first portion of the support shaft is received in the hanger aperture. A second, end portion of the support shaft has a reduced diameter and there is a shoulder between the first and second portions of the support shaft. An aperture is provided in the second arm for receiving the second, end portion of the support shaft. In use, the device is positioned on one side of the hanger and the support shaft is inserted through the hanger aperture so that the second, reduced diameter portion of the support shaft sticks out on the opposite side of the hanger. The second arm is then positioned so that the reduced diameter portion of the support shaft is in the aperture formed in the second end of the second arm. The second arm is secured to the support shaft, for example, by welding or with a locking taper pin.

14 Claims, 3 Drawing Sheets

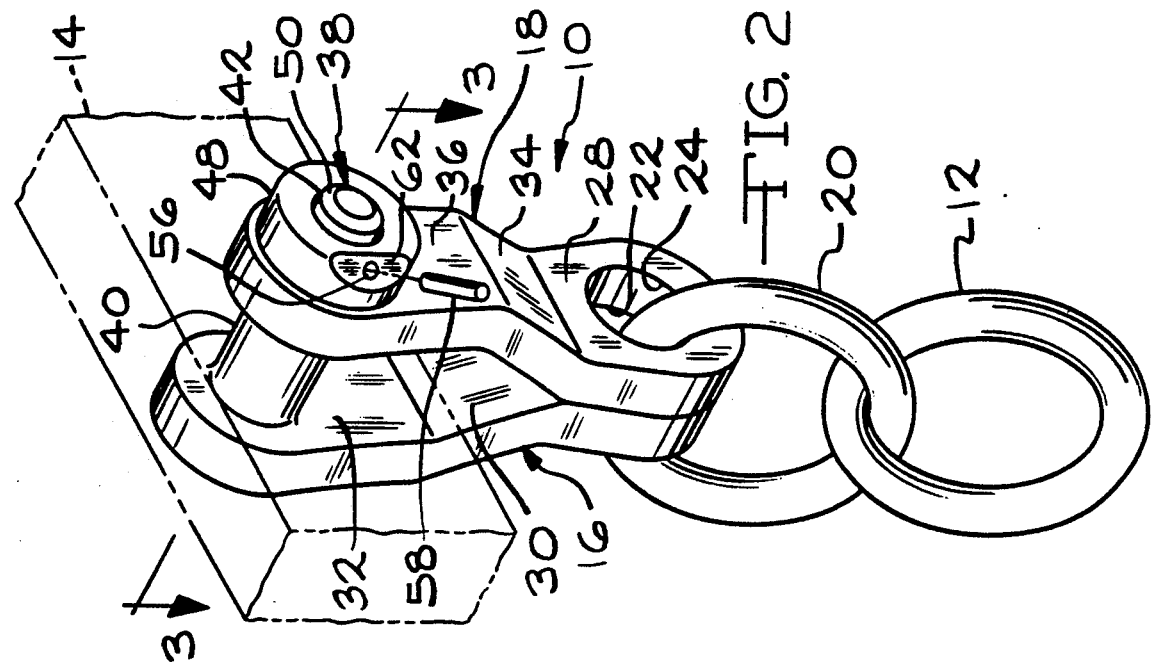
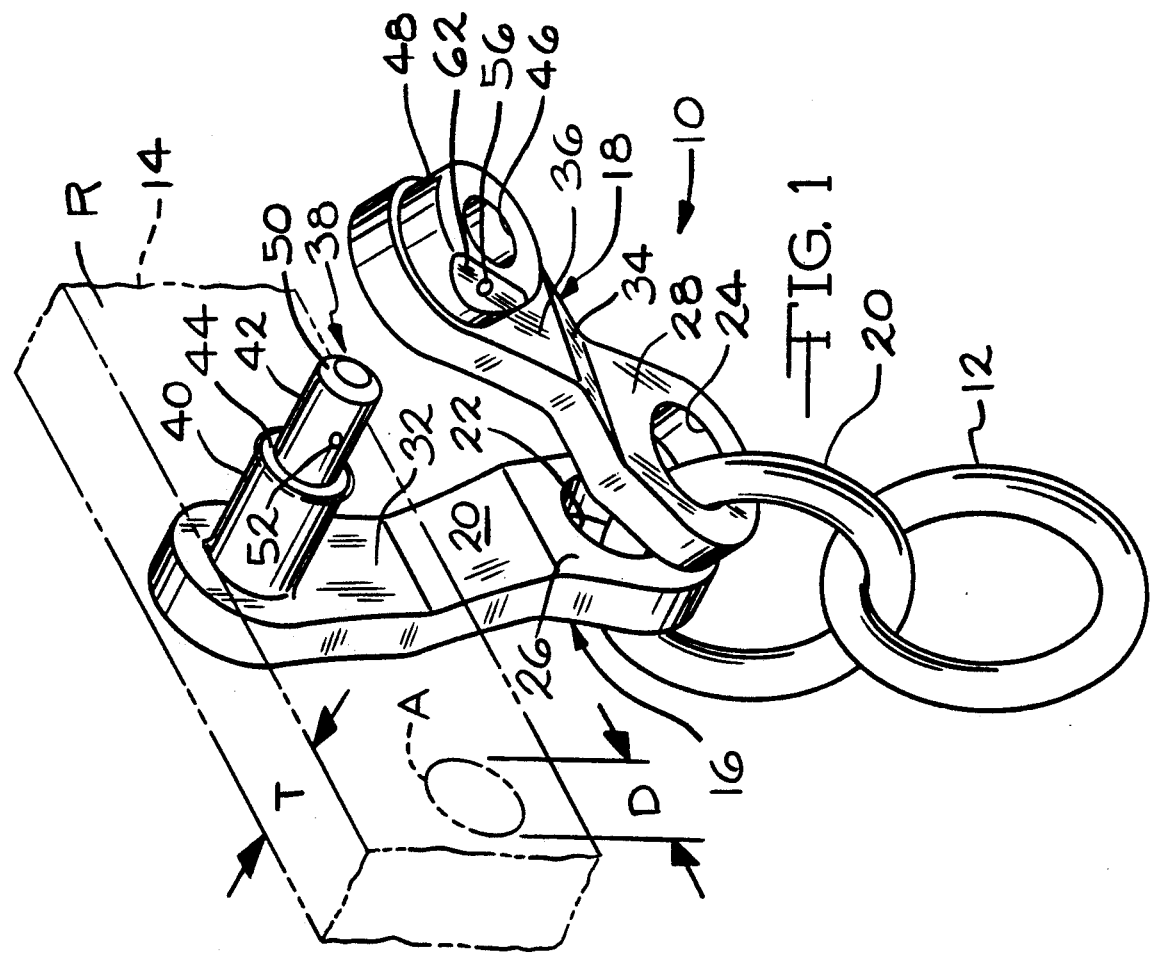

SPLIT CLEVIS ASSEMBLY FOR SUSPENDING A CHAIN ON A HANGER

BACKGROUND OF THE INVENTION

1. Field of the Invention

The present invention relates to the field of clevises that are useful for suspending chain, especially chain that is suspended in rotary kilns for heat transfer purposes.

2. Description of the Prior Art

Hardware for suspending chain in rotary kilns is known. Conventional hardware includes various forms of shackles. U.S. Pat. No. 3,958,411 discloses several forms of shackle including a straight pin which is received in aligned apertures formed in the arms of the shackle. There is a shoulder in one of the shackle arms which cooperates with a plate to retain the pin in position. The pin, of course, would be supported in an aperture in a kiln chain hanger. More simple shackles are known where a straight pin is simply positioned in the shackle arms and the pin is welded into place. A cutting torch or the like is used to remove the shackle when necessary. Other shackles are known which include threaded pins which are received in threaded apertures in one of the shackle arms.

SUMMARY OF THE INVENTION

The instant invention is based upon the discovery of an improved chain clevis which is especially suited for suspending heat transfer chain in rotary kilns. The chain clevis comprises first and second arms, each having first and second ends. An opening is provided at the first end of each arm for receiving an end link of the chain to be suspended. Preferably, the stock which is used to form the end link is positioned in the apertures in the arms, formed into a link and its ends are welded so that the end link connects the first and second arms. The apertures in the arms are sized to be larger than the end link in them so that the arms can move freely around the end link. A support shaft is provided on the second end of the first arm and the support shaft is integral with the first arm. Preferably, the first arm and the support shaft are cast as a single piece. The support shaft has a first portion, adjacent to the second end of the first arm to which it is attached, with a first diameter which is slightly less than the diameter of an aperture in a hanger from which the chain is to be suspended. The first portion of the support shaft is received in the hanger aperture. Preferably, the length of the first portion of the support shaft is slightly longer than the thickness of the hanger from which the chain will be supported. A second, end portion of the support shaft has a diameter which is less than the diameter of the first portion of the support shaft and there is a shoulder between the first and second portions of the support shaft. An aperture is provided in the second end of the second arm for receiving the second, end portion of the support shaft. The aperture in the second end of the second arm has a diameter which is slightly larger than the diameter of the second, end portion of the support shaft so that there is some clearance between the two. The device is used to support a chain on a hanger and this is easily accomplished by positioning the device on one side of the hanger, inserting the support shaft, which is connected to the first arm, through the aperture formed in the hanger so that the second, reduced diameter portion of the support shaft sticks out on the opposite side of the hanger. With the support shaft in the hanger aperture, the weight of the chain connected to the device is supported by the hanger. At this point, because the weight of the chain is supported, it is very easy to swing the second arm around the end link to position the reduced diameter portion of the support shaft in the aperture formed in the second end of the second arm, so that the second arm abuts the shoulder on the support shaft. Next, the second arm is secured to the support shaft, either by welding or, in one embodiment of the invention, with a locking pin which is received in apertures formed in the second end of the second arm and in the second, reduced diameter portion of the support shaft. When the device is supported on the hanger with the second end of the second arm against the shoulder of the support shaft, the apertures are axially aligned and the pin is inserted therein. The pin is preferably a locking taper which can be driven into the apertures and engage the walls which define the apertures, thereby locking the support shaft on the first arm and the second arm.

BRIEF DESCRIPTION OF THE DRAWINGS

FIG. 1 is a perspective view of a split clevis device according to the invention, after a support shaft secured to a first arm of the device has been inserted through an aperture in a hanger, which is shown in phantom.

FIG. 2 is a view, corresponding with FIG. 1, after a second arm of the device has engaged the support shaft of the first arm.

DETAILED DESCRIPTION OF THE INVENTION

Figure 4:
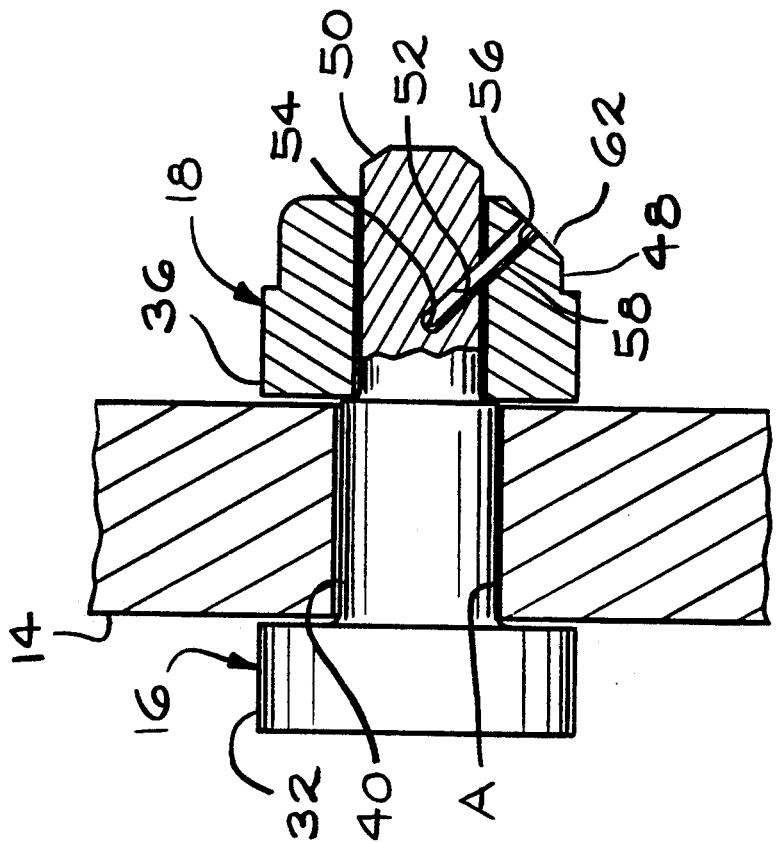
FIG. 4 is a partial cross sectional view of the device, corresponding with FIG. 3, after the locking taper has been pounded into a locking position.

Referring now to FIG. 1, a split clevis device according to the invention is indicated generally at 10. The device 10 supports a chain of links 12 (only one of which is shown in FIGS. 1 and 2) from a hanger 14 which is shown in phantom in FIGS. 1 and 2. The illustrated hanger 14 has a plurality of apertures A with a nominal diameter of D. It will be appreciated from the following discussion that the split clevis device of this invention will work just as well with a single hanger, i.e., a hanger with a single aperture (not illustrated). The hanger 14 has a nominal thickness of T.

The split clevis device 10 comprises a first arm 16 and a second arm 18. An end link 20 connects the two arms 16 and 18 and is the end link in the chain of links 12. The end link 20 extends through apertures 22 and 24 formed in the first and second arms 16 and 18. In addition, the end link 20 extends through the next link 12 in the chain. The apertures 22 and 24 are formed in a link portion 26 of the arm 16 and a link portion 28 of the arm 18, respectively.

The link portion 26 of arm 16 is connected to and integral with a transition portion 30 of the arm 16. The transition portion 30 of the arm 16 is, in turn, connected to and integral with an upper end portion 32 of the arm 16. Similarly, the link portion 28 of arm 18 is connected to and integral with a transition portion 34 of the arm 18. The transition portion 34 of the arm 18 is, in turn, connected to and integral with an upper end portion 36 of the arm 18. As illustrated in the drawings, the elements of the arms 16 and 18, thus far described, are the same. Each arm has a link portion and an upper end portion and a transition portion connected to and connecting the link and upper end portions.

The first arm 16 is provided with a support shaft 38 having a first, hanger engaging portion 40 which is integral with and connected to the upper end portion 32 of the arm 16. The support shaft 38 extends in a direction which is generally perpendicular to the upper end portion 32 of the arm 16. An arm portion 42 of the support shaft is connected to and integral with the hanger engaging portion 40 of the support shaft 38. There is a shoulder 44 between the arm portion 42 and the hanger engaging portion 40 of the support shaft 38. The hanger engaging portion 40 of the support shaft has a diameter which is slightly less than the diameter D of the aperture A in the hanger 14. The hanger engaging portion 40 of the support shaft 38 has a length which, preferably, is equal to or slightly longer than the thickness T of the hanger 14.

An aperture 46 is formed in the upper end portion 36 of the arm 18 and extends through a boss 48 which is connected to and integral with the upper end portion 36. The aperture 46 has a diameter which is slightly larger than the diameter of the arm portion 42 of the support shaft 38, so that the latter is easily received in the former.

Figure 3:
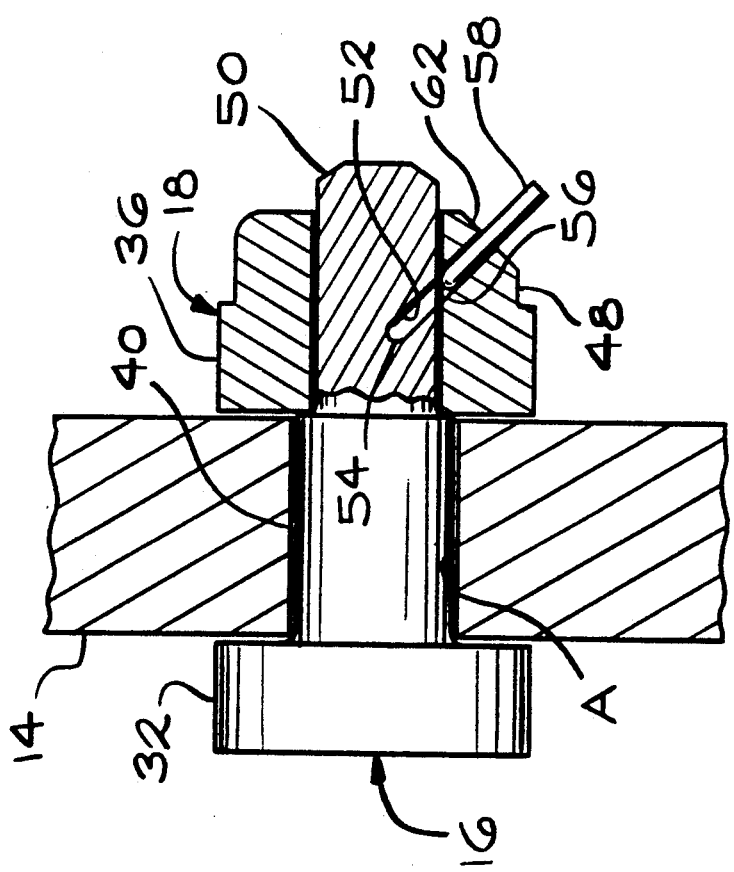
FIG. 3 is a partial cross sectional view, taken along the line 3—3, of the device supporting a chain on the hanger, with a locking taper partially inserted.

Referring now to FIGS. 1 and 2, a method for suspending a kiln chain comprising links 12 and a split clevis device 10 from a hanger 14 having a thickness T, will now be described. The arm 16 is manipulated to insert the support shaft 38 into a hanger aperture A, and into the position illustrated in FIG. 1. The length of the hanger engaging portion 40 of the support shaft 38 is equal to or slightly longer than the thickness T of the hanger so that, when the support shaft 38 is inserted into a hanger aperture A as shown in FIG. 1, the shoulder 44 will be flush or extend slightly beyond a side surface F of the hanger 14. Once the support shaft 38 has been inserted in the hanger aperture A, the entire kiln chain of links 12 will be supported by the hanger 14 and a kiln chain installer can release the arm 16 to proceed with the next step. The arm 18 is manipulated to align the arm portion 42 of the support shaft 38 and the aperture 46 in the upper end portion 36 of the arm 18. Once aligned, the arm 18 is positioned on the support shaft as shown in FIG. 2. At this stage, the arms 16 and 18 must be secured together and this may be done, for example, by welding the end of the support shaft 38, adjacent a chamfered edge 50 to the adjacent portion of the boss 48. Other means for securing the arms 16 and 18 together are described below with reference to FIGS. 3 and 4.

In the arm portion 42 of the support shaft 38, there is a bore 52 which terminates in and end 54 in the arm portion 42 of the support shaft 38. When the arms 16 and 18 are in the relative positions shown in FIG. 2, where the bore 52 in the arm portion 42 of the pin 38 of the arm 16 is axially aligned with a bore 56 which extends from the outside of the boss 48 through to the aperture 46 therein. The bores 52 and 56 are sized to receive a locking taper 58 as shown in FIG. 4. In known fashion, the taper 58 is pounded into and partially through the bore 56, into the bore 52 and against the end of the bore 52. A bevelled surface 62 is formed in the boss 48 so that the surface 62 is substantially perpendicular to the axis of the bore 56. The bevelled surface 62 facilitates the formation of the bore 56 in the boss 48. With the arms 16 and 18 and the locking taper 58 in the relative positions shown in FIG. 3, a hammer blow or other impact is brought to bear on the exposed portion of the locking taper 58, causing it to engage the wall which defines the bore 56 in the arm 18 and the wall which defines the bore 52, thereby locking the support shaft 38, and the arm 16, relative to the arm 18. It will be appreciated that other means may be substituted for the locking taper 58. For example, the bore 56 could be threaded (not shown) to receive a socket head threaded shoulder pin (not shown). Other suitable means will be apparent to those skilled in the art.

Figure 5:
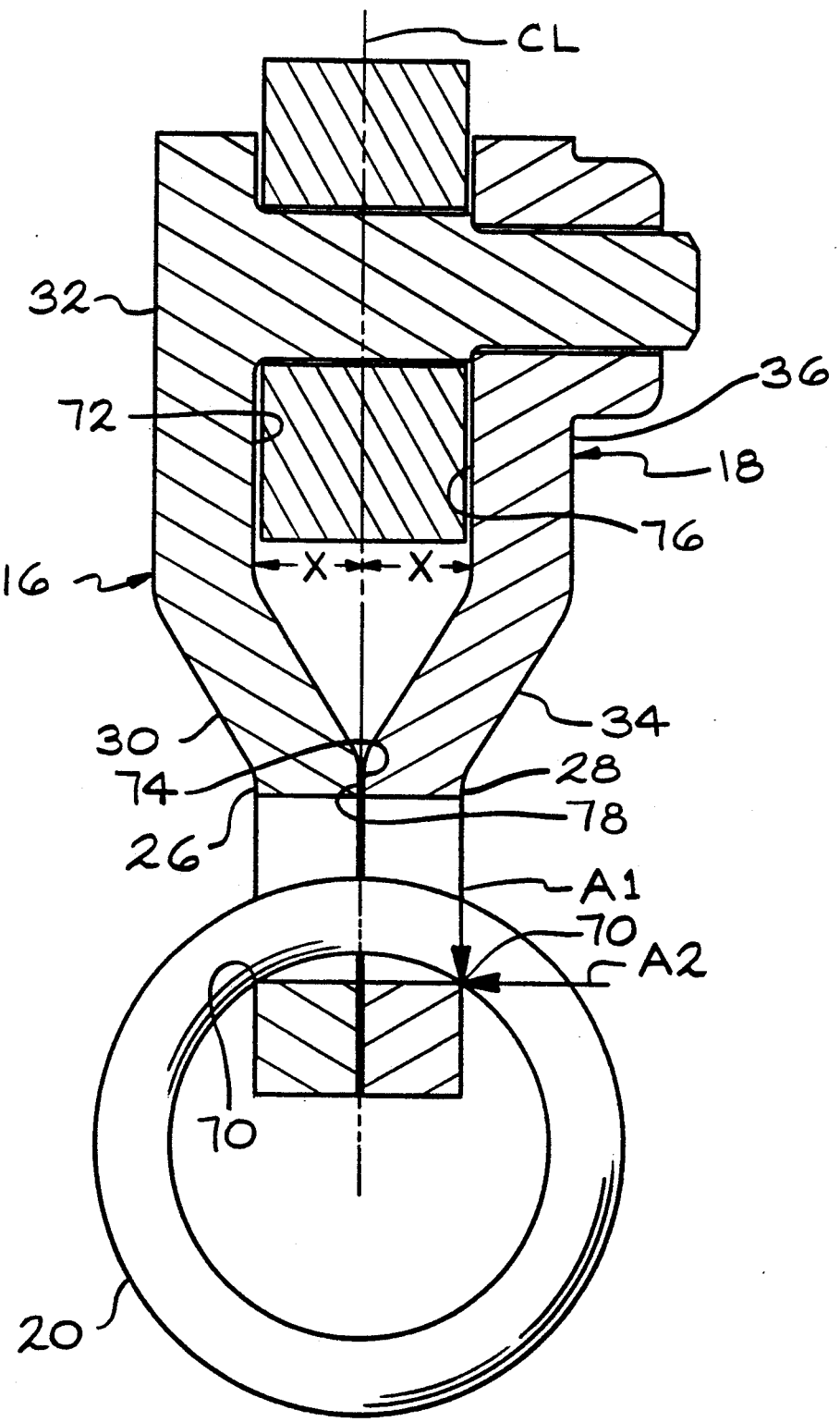
FIG. 5 is a partial cross sectional view of the device, taken along the line 5—5.

The geometry of the embodiment illustrated in the drawings provides the device 10 with several important features. When the device 10 is in a closed position, i.e., the position illustrated in FIGS. 2-4, an interior, substantially planar surface (not numbered) of the link portion 26 of the arm 16 engages an interior, substantially planar surface (not numbered) of the link portion 28 of the arm 18. When the device 10 is in the closed position supporting a chain of links 12 from a hanger, but the arms 16 and 18 are not locked together, as by welding or by a taper, or the like, the end link 20 interacts with the link portions 26 and 28 of the arms 16 and 18, respectively, to maintain the device in a closed position. While this interaction maintains the device in the closed position, the application of means for locking the arms 16 and 18 against relative movement is greatly facilitated. Referring now to FIG. 5, there are two points 70 where the end link 20 contacts the walls defining the link apertures 22 and 24. This contact is adjacent an outside surface of each arm 16 and 18. The force acting on the two contact points 70 has a downward component indicated by arrow A1 and a closing component indicated by arrow A2. Substantially equal but opposite closing components are applied to the link portions 26 of arm 16 and link portion 28 of arm 18.

The transition portions 30 and 34 of the arms 16 and 18, respectively, contribute to the geometry discussed in the preceding paragraph. The hanger 14 has a center plane indicated by the designation CL. The center plane CL is the plane which is halfway between the major surfaces of the hanger 14. The upper end portions 32 and 36 of the arms 16 and 18, respectively, are spaced apart a distance of 2X, X being shown in FIG. 5 to be the distance from the center plane CL of the hanger 14 to each of the upper end portions 32 and 36. The distance of 2X also corresponds with the length of the hanger engaging portion 40 of the support shaft 38. The transition portion 30 of arm 16 connects the upper end portion 32 to the link portion 26 so that an inside surface 72 of the upper end portion 32 is parallel to an inside surface 74 of the link portion 26 and so that the inside surfaces 72 and 74 are displaced from one another, in a direction perpendicular to each surface, a distance of X. Likewise, the transition portion 34 of arm 18 connects the upper end portion 36 to the link portion 28 so that an inside surface 76 of the upper end portion 36 is parallel to an inside surface 78 of the link portion 28 and so that the inside surfaces 76 and 78 are displaced from one another, in a direction perpendicular to each surface, a distance of X. Accordingly, when the arms 16 and 18 are in the closed position, the inside surfaces 74 and 78 of the link portions 26 and 28 are parallel and they are in face to face contact.

The device is produced by forming blanks for the arms 16 and 18, preferably by casting. Suitable materials are steels and low carbon steel is preferred except where the application demands stainless steel. The blanks (not shown) are machined, as necessary, although the arms lend themselves well to casting and very little machining is required. As indicated previously, the preferred fabrication technique would entail forming the arms 16 and 18 and forming a chain of links 12, and forming from stock an end link 20, in place, so that the end link 20 is connected to the rest of the chain of links 12, and so that the end link 20 passes through the link apertures 22 and 24 of the arms 16 and 18.

The foregoing description is intended to enable one skilled in the art to practice the invention and, further, to set forth the best mode known to the inventors for practicing the invention. It will be appreciated that the various modifications may be made in the details of construction set forth above, without departing from the spirit and scope of the invention as it is defined in the appended claims. For example, the arms could be thinned down in non-critical sections without affecting their ability to function as described above. Other changes and modifications will be apparent.

What is claimed is:

1. A device for suspending chain from a given hanger having a given thickness and an aperture having a given diameter extending therethrough, said device comprising first and second arms, each comprising
an upper end portion at one end,
a link portion at the other end with an aperture for receiving a chain link, said aperture extending through said link portion, each of said link portions further comprising an inside surface which, when said arms are in a closed position, are in face to face contact and
a transition portion integral with and connected to said upper end portion and said link portion, said first arm having an aperture extending through said upper end portion thereof, said second arm further comprising
a support shaft connected to and extending in a generally perpendicular direction from an inside surface of said upper end portion of said second arm, said shaft comprising
a first portion having a length which is slightly longer than the thickness of the hanger and a diameter which is less than the given diameter of the aperture in the hanger,
a second portion connected to said first support shaft portion and having a diameter less than the diameter of the first shaft portion and
shoulder means on said support shaft,
wherein, said second portion of said support shaft is receivable in the aperture formed in said upper end portion of the first arm, wherein said shoulder means abuts a portion of the second arm when said second portion of the support shaft is received in the aperture formed in said upper end portion of the first arm and the arms are in the closed position in which said upper end portions of said arms are spaced apart a distance which is greater than the thickness of the hanger.

2. The clevis claimed in claim 1 wherein there are bores formed in the first arm and in the second portion of the support shaft and wherein these bores are positioned so that they align when the arms are in a closed position.

3. The clevis claimed in claim 1 wherein said arms are configured so that when said arms are in the closed position, said inside surfaces of said link portions are in face to face contact along a plane which is coincident with the center plane of the hanger.

4. The clevis claimed in claim 1 wherein said shoulder means comprises a shoulder between the first and second portions of the support shaft.

5. The clevis claimed in claim 1 wherein said first arm is an integral piece formed by casting and wherein said second arm and said support shaft are constituted by an integral piece formed by casting.

6. A heat transfer chain and clevis connected thereto for suspending the chain from a hanger having a given thickness and an aperture having a given diameter extending therethrough, said chain and clevis comprising a chain comprised of a plurality of interlocked links terminating, at one end, in a closed end link, and
first and second arms, each comprising
an upper end portion at one end,
a link portion at the other end with an aperture extending through said link portion, each of said link portions further comprising an inside surface which, when said arms are in a closed position, are in face to face contact and
a transition portion integral with and connected to said upper end portion and said link portion, said end link being disposed in the apertures in the link portions of the first and second arms so that it connects said first and second arms to each other and to the rest of the chain of links, said first arm having an aperture extending through said upper end portion thereof, said second arm further comprising
a support shaft connected to and extending in a generally perpendicular direction from an inside surface of said upper end portion of said second arm, said shaft comprising
a first portion having a length which is slightly longer than the thickness of the hanger and a diameter which is less than the given diameter of the aperture in the hanger,
a second portion connected to said first support shaft portion and having a diameter less than the diameter of the first shaft portion and
shoulder means on said support shaft,
wherein, said second portion of said support shaft is receivable in the aperture formed in said upper end portion of the first arm, wherein said shoulder means abuts a portion of the second arm when said second portion of the support shaft is received in the aperture formed in said upper end portion of the first arm and the arms are in the closed position in which said upper end portions of said arms are spaced apart a distance which is greater than the thickness of the hanger.

7. The heat transfer chain and clevis claimed in claim 6, wherein there are bores formed in the first arm and in the second portion of the support shaft and wherein these bores are positioned so that they align when the arms are in a closed position.

8. The clevis claimed in claim 6 wherein said arms are configured so that when said arms are in the closed position, said inside surfaces of said link portions are in face to face contact along a plane which is coincident with the center plane of the hanger.

9. The clevis claimed in claim 6 wherein said shoulder means comprises a shoulder between the first and second portions of the support shaft.

10. The clevis claimed in claim 6 wherein said first arm is an integral piece formed by casting and wherein said second arm and said support shaft are constituted by an integral piece formed by casting.

11. A device for suspending chain from a given hanger having a given thickness and an aperture having a given diameter extending therethrough, said device comprising first and second arms, each comprising
      an upper end portion at one end,
      a link portion at the other end with an aperture for receiving a chain link, said aperture extending through said link portion, each of said link portions further comprising an inside surface which, when said arms are in a closed position, are in face to face contact and
      a transition portion integral with and connected to said upper end portion and said link portion, said first arm having an aperture extending through said upper end portion thereof, said second arm further comprising
      a support shaft connected to and extending in a generally perpendicular direction from an inside surface of said upper end portion of said second arm, said shaft being receivable in said aperture in said upper end portion of said first arm.

12. The clevis claimed in claim 11 wherein there are bores formed in the first arm and in the support shaft and wherein these bores are positioned so that they align when the arms are in the closed position.

13. The clevis claimed in claim 11 wherein said arms are configured so that when said arms are in the closed position with the support shaft positioned in a hanger aperture, said inside surfaces of said link portions are in face to face contact along a plane which is coincident with the center plane of the hanger.

14. The clevis claimed in claim 11 wherein said first arm is an integral piece formed by casting and wherein said second arm and said support shaft are constituted by an integral piece formed by casting.

* * * * *

UNITED STATES PATENT AND TRADEMARK OFFICE
CERTIFICATE OF CORRECTION

PATENT NO. : 5,279,106
DATED : January 18, 1994
INVENTOR(S) : Shanks et al.

It is certified that error appears in the above-identified patent and that said Letters Patent is hereby corrected as shown below:

Column 3, Line 68 should read:
    54 of the bore 52. A bevelled surface 62 is formed in the Signed and Sealed this Twelfth Day of July, 1994

Attest:

BRUCE LEHMAN

Attesting Officer      Commissioner of Patents and Trademarks